United States Patent [19]

Endo et al.

[11] Patent Number: 4,749,270
[45] Date of Patent: Jun. 7, 1988

[54] MICROMANIPULATOR FOR INVERTED-DESIGN MICROSCOPE

[75] Inventors: Itaru Endo; Toshimi Hayasaka; Katsura Motomura; Yasuo Inoue, all of Hachioji; Eiichi Narishige; Shinji Yoneyama, both of Tokyo, all of Japan

[73] Assignee: Olympus Optical Co., Ltd., Tokyo, Japan

[21] Appl. No.: 869,440

[22] Filed: Jun. 2, 1986

[51] Int. Cl.⁴ ............................................. G02B 21/26
[52] U.S. Cl. ..................................... 350/531; 350/530
[58] Field of Search ................ 350/518, 529, 530, 531

[56] References Cited

U.S. PATENT DOCUMENTS 3,680,947 8/1972 Wanesky .......................... 350/529

FOREIGN PATENT DOCUMENTS 1020189 11/1957 Fed. Rep. of Germany ...... 350/531
0213525 9/1984 Fed. Rep. of Germany ...... 350/530

OTHER PUBLICATIONS

Hacker Instruments, Inc., "Micromanipulators", Jan. 1972.

Primary Examiner—John K. Corbin
Assistant Examiner—Ronald M. Kachmarik
Attorney, Agent, or Firm—Louis Weinstein

[57] ABSTRACT

A micromanipulator for an inverted design microscope comprises a needle carrier disposed between a stage and a condenser lens of the microscope for carrying a glass needle in the direction of an optical axis. It also includes a centering mechanism which causes a displacement of the glass needle in a plane orthogonal to the optical axis, a hydraulic drive mechanism disposed on the upper surface of the stage for supporting the needle carrier to cause a vertical movement of the glass needle carried by the carrier along the optical axis, and a hydraulic operator connected to the hydraulic drive mechanism through a hydraulic transmission tube.

40 Claims, 9 Drawing Sheets

MICROMANIPULATOR FOR INVERTED-DESIGN MICROSCOPE

FIELD OF THE INVENTION AND RELATED ART STATEMENT

The invention relates to a micromanipulator for an inverted-design microscope, or more particularly, to a micromanipulator associated with an inverted design microscope for performing a variety of minute operations upon an object to be observed.

Figure 1:
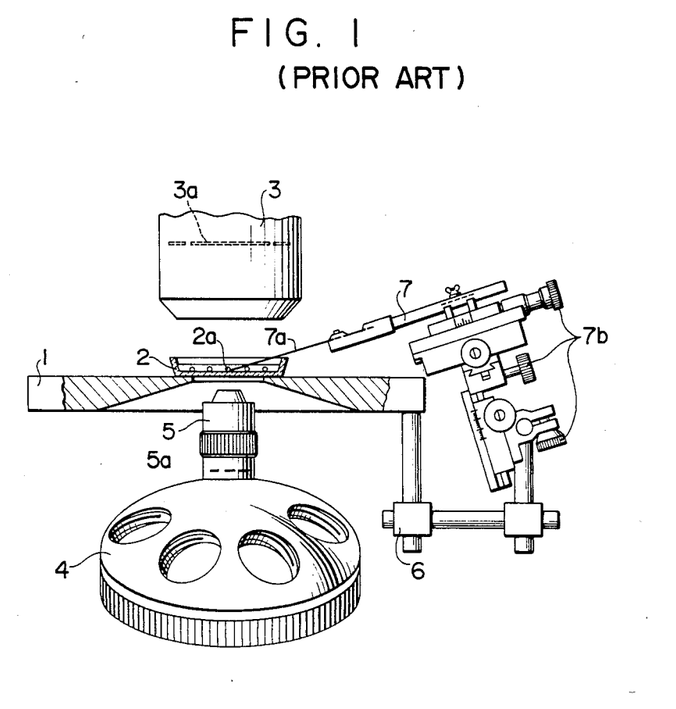
FIG. 1 is a front view of one exemplary micromanipulator for inverted-design microscope of the prior art.

A typical micromanipulator for inverted-design microscope of the prior art is illustrated in FIG. 1. As shown, the microscope includes a stage 1 on which is placed a culture vessel 2 which contains a specimen such as cells 2a. An illuminion optical system comprising a condenser lens 3 having a ring slit 3a internally is disposed above the stage 1 for illuminating the specimen. On the other hand, a revolver 4 is disposed below the stage 1, and an objective lens 5 internally including a phase plate 5a is mounted on the revolver for observation of the specimen. The manipulator shown is mounted with respect to the stage 1 of such microscope. Specifically, a fixture 6 is secured to the lower surface of the stage 1, and is coupled to a micromanipulator 7 through a vertical motion mechanism, a back-and-forth motion mechanism and a lateral motion mechanism, each of which may comprise a rack and a pinion, so that a glass needle 7a disposed at the extremity of the micromanipulator extends toward the cell 2a in the culture vessel 2 or toward the focal position of the microscope.

The purpose of the micromanipulator is to effect a pricking technique which causes the glass needle 7a of the micromanipulator 7 to pierce through one of the cells 2a in the vessel 2 to permit an enzyme contained in the culture solution to permeate into the cell. When the glass needle 7a is to pierce one of the cells 2a, resulting damage to the particular cell must be minimized, by directing the extremity of the manipulator in the exact direction toward the particular cell 2a and enabling a minute movement of the manipulator which is free from oscillations or meandering movement. However, with a conventional arrangement, this must be achieved by directly operating the operating members 7b of the manipulator 7 manually, and hence any trembling motion which occurs in the finger or fingers of the hand is likely to be transmitted to the glass needle 7a through the manipulator 7. In addition, an increased length from the mounting location of the fixture 6 on the stage 1 to the extremity of the glass needle 7a tends to magnify any oscillating motion transmitted to the glass needle 7a, and thus any external oscillation or trembling motion of the finger may be magnified when it is transmitted to the glass needle 7a. For this reason, when the pricking operation is to be performed, the manipulator 7 must be operated gently while suppressing any trembling motion of the finger to the maximum possible degree and while waiting for the influence of any external oscillation to settle down. Thus, the operation of the manipulator requires extreme care and is quite difficult, and thus requires a high level of skill and time.

Another problem of the prior manipulator 7 relates to the plurality of operating members 7b thereof which are mechanically interlocked with each other. This results in a complex construction of the mechanically interlocked mechanism, resulting in a reduced level of reliability and durability of the apparatus. Also, the location of the individual operating members 7b is limited, presenting another difficulty relating to the degraded ease of operation. The bottom surface of the culture vessel 2 or the surface of a cell being cultured are generally not uniform, so that when the free end of the glass needle 7a is lowered to the focal position, the free end of the glass needle 7a may inadvertently be brought into abutment against the bottom surface of the vessel 2, thus causing a fracture of the glass needle 7a. As a consequence, the efficiency of the pricking operation is degraded.

OBJECT AND SUMMARY OF THE INVENTION

It is a primary object of the invention to overcome the described difficulties of the prior art, by providing a micromanipulator for an inverted-design microscope which enables a greatly facilitated and rapid operation without the need for suppressing any trembling motion of the finger and while minimizing the influence of any external oscillations.

It is another object of the invention to provide a micromanipulator for an inverted-design microscope which achieves a high level of reliability and durability of the manipulator while drastically improving the operational efficiency of the pricking technique, by avoiding a fracture of the glass needle during the pricking technique.

In accordance with the invention, the micromanipulator includes a needle holder which is remotely operated under hydraulic drive. This technique prevents any trembling motion of the finger from being transmitted to a glass needle. The needle holder is located above a stage while the hydraulic drive mechanism is mounted on the upper surface of the stage, thus reducing the length from the location of the mechanism to the free end of the glass needle. This arrangement reduces the susceptibility of the glass needle to oscillations. Thus, it is unnecessary to suppress any trembling motion of the finger intentionally during the operation, and the influence of any external oscillation is minimized, allowing the manipulator to be operated rapidly and in a facilitated manner. By way of example, when the pricking operation is to be conducted, it has been an upper limit to treat about five hundred cells per hour in the prior art practice, while with the manipulator of the invention, an increased number of cells between one to two thousand can be treated. A hydraulic operator which causes a vertical motion of the glass needle is connected to the hydraulic drive mechanism merely through a hydraulic transmission tube, allowing the hydraulic operator to be freely located relative to the microscope, thus improving the ease of operation. Since the manipulator is mounted on the upper surface of the stage, mere replacement of the stage allows a conversion from an inverted-design microscope with manipulator to a normal inverted-design microscope. The glass needle is carried by an annular needle holder in the direction of the optical axis through a hollow or transparent member, thus preventing it from causing an interference with a phase contrast operation.

A plurality of hydraulic drive mechanisms can be connected together through hydraulic transmission tubes for coupling them together in a simple manner, thus greatly simplifying the construction of interlocked mechanisms, and with consequent increase in the level of reliability and durability of the apparatus.

In the event the bottom surface of a culture vessel or the surface of a cell being cultured is not a flat plane, the lower limit for the position of the free end of the glass needle may be established at a focal position, whereby it is assured that the free end will come to a stop at the focal position whenever the glass needle is lowered. If the focal position is changed, the free end is again stopped at the changed focal position. This avoids a fracture of the glass needle during the pricking operation, thus drastically improving the operational efficiency thereof.

DETAILED DESCRIPTION OF PREFERRED EMBODIMENTS

Figure 2:
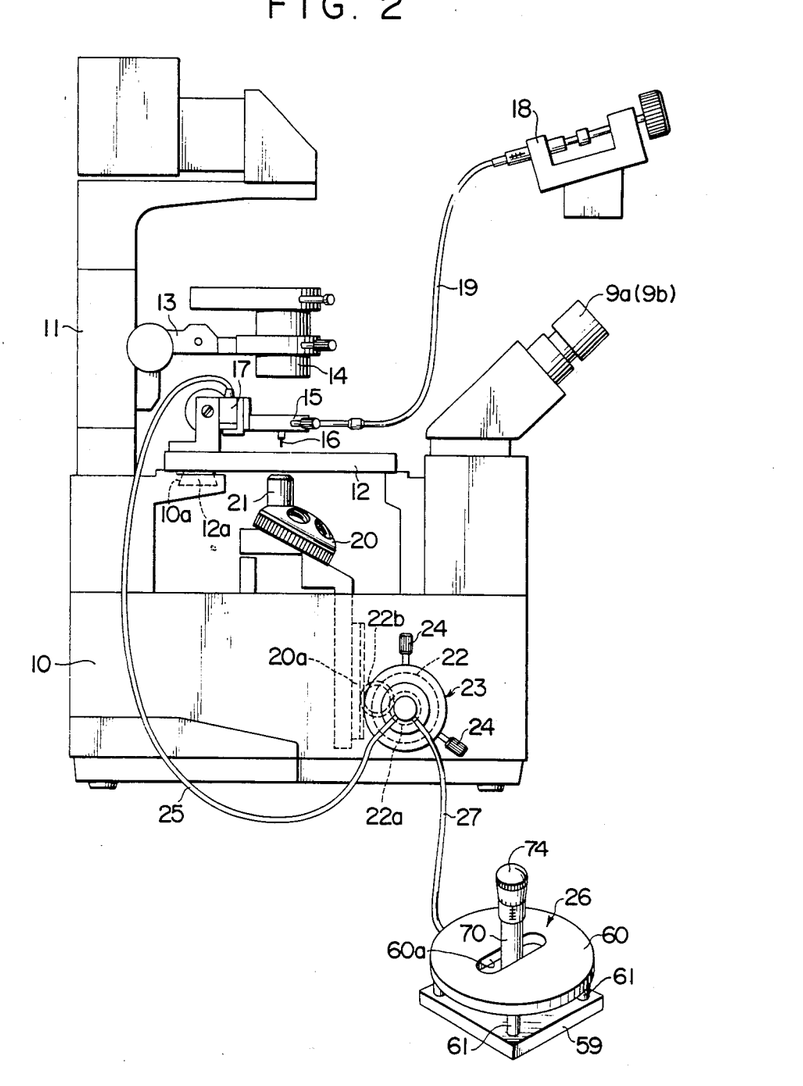
FIGS. 2 and 3 are a side elevation and a front view of a micromanipulator for inverted-design microscope according to one embodiment of the invention.
Figure 3:
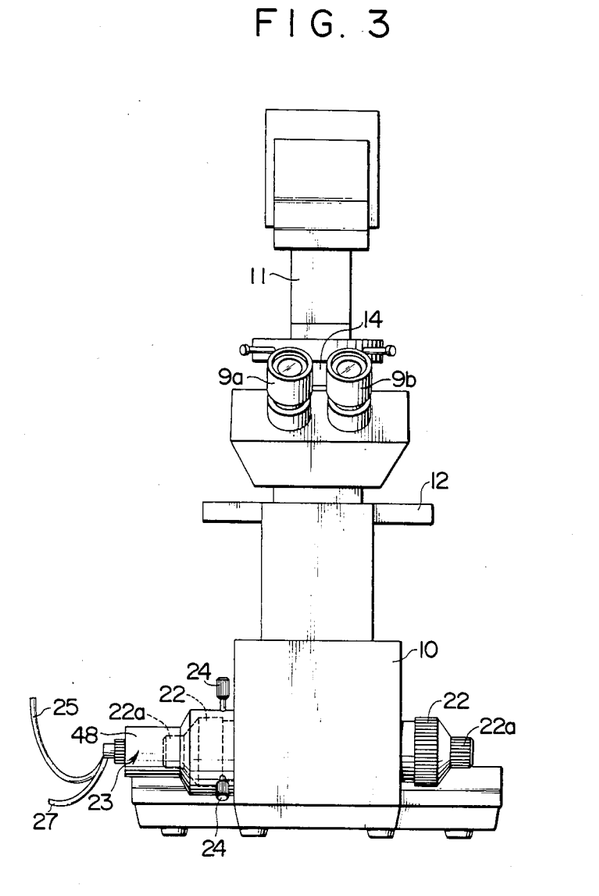

An inverted design microscope which is adapted to have a micromanipulator according to the invention mounted thereon is illustrated in FIGS. 2 and 3. As shown, the microscope includes a body 10, from the rear portion of which extends an integral stanchion 11 in an upright manner which is used for mounting an illumination system thereon. Intermediate the length of the stanchion 11, a stage 12 is detachably mounted relative to the body 10 through a translational structure including a dovetail 12a and a dovetail groove 10a. A condenser lens 14 is carried by a condenser holder 13 which is mounted on the stanchion 11 at a location above the stage 12, thus projecting light from a source of illumination, which is secured to the top of the stanchion 11, over the stage.

An objective lens 21 is detachably mounted on a revolver 20 disposed below the stage 12, and allows a specimen which is placed on the stage 12 to be observed through the objective lens and through a pair of binocular lens barrels 9a, 9b. The revolver 20 is laterally disposed and extends through the bottom portion of the body 10 and includes a pair of externally exposed ends, which are coupled through a combination of a rack 20a and a pinion 22b to a coarse/fine motion assembly of a known construction which includes a drive shaft carrying a pair of handles including a coarse motion handle 22 and a fine motion handle 22a for the focussing operation. As the handles 22 and 22a are turned, the revolver 20 can be moved vertically up and down relative to the body 10 to achieve a focussing of the objective lens 21.

The micromanipulator according to the invention essentially comprises a needle carrier 15 which carries a glass needle 16 of the manipulator in the direction of an optical axis of observation, an hydraulic drive mechanism 17 for providing a vertical motion of the carrier 15 hydraulically, an hydraulic operator 26 for operating the hydraulic drive mechanism 17, and another hydraulic drive mechanism 23 for detecting the stroke of movement of the objective lens 21 and for transmitting the stroke to the hydraulic drive mechanism 17 associated with the carrier. The manipulator is mounted on the microscope in a manner such that the needle carrier 15 is disposed intermediate the stage 12 and the condenser lens 14 while allowing the carrier 15 to maintain the glass needles 16 in a vertically depending manner. The needle carrier 15 includes a centering mechanism for the glass needle 16.

Figure 4:
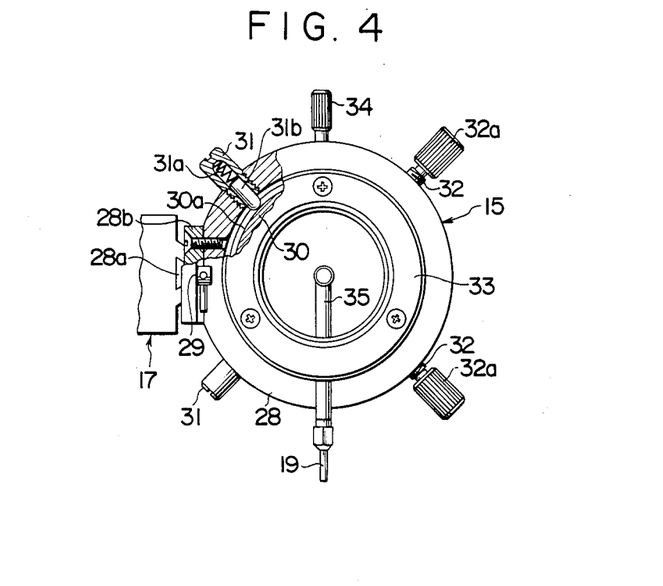
FIGS. 4 and 5 are a plan veiw and a longitudinal section, partly broken away, of the needle holder of the embodiment shown in FIGS. 2 and 3.
Figure 5:
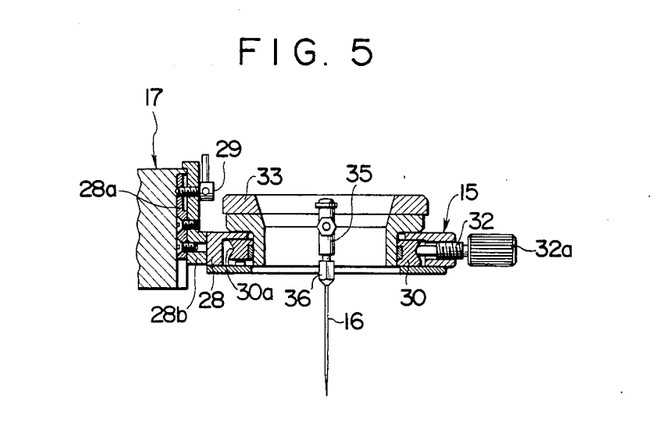

As shown in FIGS. 4 and 5, the needle carrier 15 essentially comprises an annular support frame 28 which is substantially integrally mounted on the hydraulic drive mechanism 17 associated with the holder, an annular centering frame 30 which is disposed within the support frame 28 so as to be movable in a plane orthogonal to the direction of the optical axis, a holder frame 33 fitted in and detachably secured to the feed frame 30, and an L-shaped holder 35 having a horizontal portion which extends through the holder frame 33 and its free end extending downwardly at the center of the holder frame 33 and having a clamp screw 36 which is used to secure the glass needle 16, the central portion of the holder being formed of a transparent material and its one end opposite from the free end being connected to a hydraulic pressure transmitting tube 19.

The holder frame 33 comprises an annular body fitted inside the centering frame 30 and having a flange integrally formed around its periphery at its top, which flange is adapted to be placed on the support frame 28. By tightening a lock screw 34 which extends through the support frame 28 and threadably engaged with the centering frame 30, the holder frame is secured to the centering frame 30. The holder frame can be separated from the centering frame 30 by loosening the lock screw 34. The centering mechanism comprises a pair of spring sets 31 which are threadably engaged with the support frame 28 in a radial direction and a pair of threaded shafts 32 each having a centering knob 32a, both of which sets are urged against a V-shaped groove 30a formed in the peripheral surface of the centering frame 30. Each spring set 31 comprises a spring 31a and an abutment pin 31b which are received within a hollow screw, with the hollow screw being threadably engaged with the support frame 28 and the abutment pin 31b disposed in abutment against the peripheral groove 30a. The threaded shaft 32 which carries the centering knob 32a is disposed in opposing relationship with one of the spring sets 31 and is threadably engaged with the support frame 28 so that its free end presses against the peripheral groove 30a. It will be noted that the pair of spring sets 31 and the pair of threaded shafts 32 are equi-angularly spaced apart. Accordingly, by adjusting the spring sets and the threaded shafts to move the centering frame 30, the movement of the latter can be transmitted through the holder frame 33 to control the centering operation which positions the glass needle 26 on the optical axis of the objective lens.

The needle carrier 15 thus constructed includes a dovetail 28a extending vertically and secured to one lateral side of the support frame 28 by means of a mounting member 28b. The dovetail 28a fits in a dovetail groove 46a (see FIGS. 6 and 7) formed in the hydraulic drive mechanism 17 associated with the holder, and by tightening a clamp screw 29 which is threadably engaged with the mounting member 28b, it can be integrally coupled to a slide 46 (see FIGS. 6 and 7), having the dovetail groove 46a formed therein, of the hydraulic drive mechanism 17. Accordingly, the needle carrier 15 mvoes up and down together with the slide 46. The L-shaped holder 35 which is carried by the needle carrier 15 is connected to an injector 18 which is disposed externally of the body 10 of the microscope, through the hydraulic pressure transmitting tube 19, as shown in FIG. 2, whereby by filling the tube 19 with a silicone oil or the like, pressure can be applied to a liquid chemical contained within the glass needle 16 to displace it from the needle tip.

Figure 6:
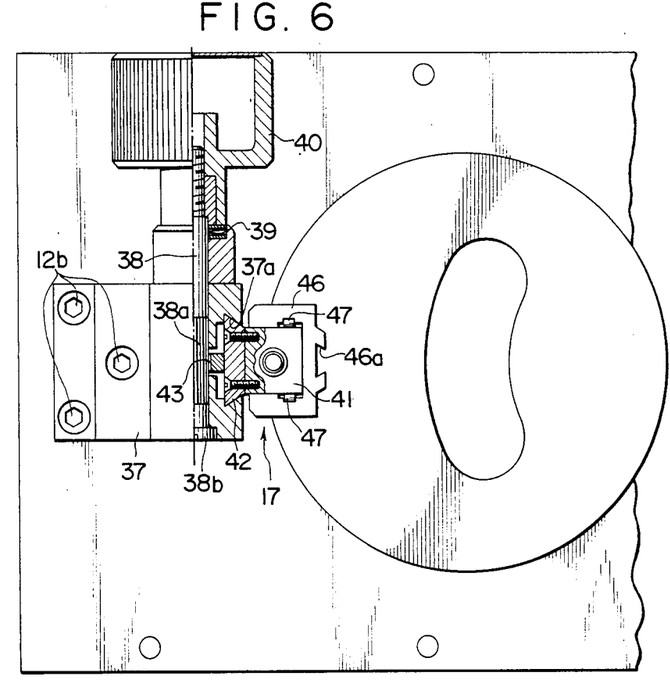
FIGS. 6 and 7 are a plan view and a longitudinal section, partly broken away, of an hydraulic drive mechanism associated with a holder which is used in the embodiment shown in FIGS. 2 and 3.
Figure 7:
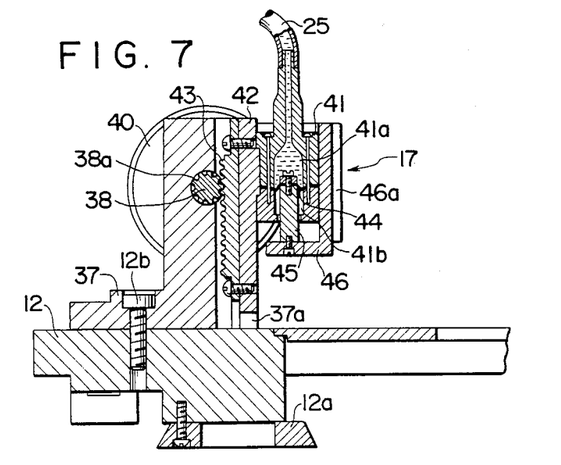

As shown in FIGS. 6 and 7, the hydraulic drive mechanism 17 associated with the holder comprises a mounting base 37 having a laterally reversed L-configuration in cross section and having its horizontal limb secured to the upper surface of the stage 12 by means of a screw 12b, a pinion shaft 38 disposed horizontally to extend through the vertical limb of the mounting base 37 in a rotatable manner and carrying a coarse motion handle 40 mounted on one end thereof for rotation, a first hydraulic cylinder 41 integrally mounted on a rack 43 which meshes with a pinion 38a formed on the pinion shaft 38 intermediate its length, a piston rod 45 fitted into the first hydraulic cylinder 41 and is actuated by oil under pressure within the cylinder 41, and the slide 46 mentioned above which is integrally secured to the piston rod 45 by a set screw and having the dovetail groove 46a formed therein in which the support frame 28 of the needle carrier 15 is mounted.

The pinion shaft 38 extends through and is rotatably carried in the mounting base 37, and is formed with a head 38b at its one end which prevents its withdrawal and has a Belleville spring 39 fitted on its other end, which is followed by the coarse motion handle 40 which is threadably engaged thereon. When the pinion shaft 38 is maintained fixed while the coarse motion handle 40 is rotated in a direction to screw it on, the Belleville spring 39 is compressed to produce a reaction of an increased magnitude, which can be utilized to adjust an operating force to move the pinion shaft 38 and the coarse motion handle 40 in an integral manner. The force of friction acting between the pinion shaft 38 and the coarse motion handle 40 is chosen to be sufficiently great, due to the force of friction produced by the Belleville spring 39, to prevent the coarse motion handle 40 alone from rotating relative to the pinion shaft 38, thus causing its loosening.

A longitudinally extending dovetail groove 37a is formed in the inside of the vertical limb of the mounting base 37, and is engaged by a dovetail 42 which carries the rack 43 meshing with the pinion 38a. The cylinder 41 is secured to the dovetail 42. Accordingly, the cylinder 41 may be moved up and down relative the mounting base 37 by utilizing the coarse motion handle 40. The interior of the cylinder 41 is partitioned by a rolling diaphragm 44 into an oil chamber 41a and a vacant chamber 41b, with the top end of the piston rod 45 being secured to the rolling diaphragm 44. The slide 46 is channel-shaped in transverse section so as to surround the cylinder 41, and thus is mounted on the outside of the cylinder 41 so as to be movable in the vertical direction with roller guides 47 interposed therebetween. At its lower end, the slide 46 includes a horizontally extending limb, to which the lower end of the piston rod 45 is secured. The dovetail groove 46a is formed in the backside of the vertical wall of the slide 46 and is engaged by the dovetail 28a on the support frame 28.

Figure 8:
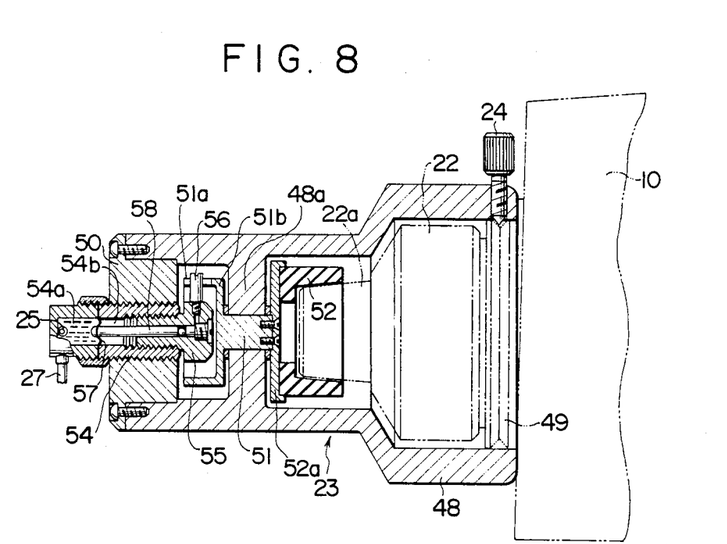
FIG. 8 is a transverse section of an hydraulic drive mechanism which is mechanically associated with a focussing operation used in the embodiment of FIGS. 2 and 3.

As shown in FIG. 8, the hydraulic drive mechanism 23 associated with the focussing operation is disposed around one of the focussing handles, 22. The drive mechanism 23 comprises a cylindrical frame 48 secured to the body 10 of the microscope in coaxial relationshp with the focussing handle 22, a transmission drum 52 disposed within the frame 48 and urged into abutment against the fine motion handle 22a for integral rotation therewith, a threaded shaft 55 disposed for axial movement back and forth through a transmission shaft 51 which is coupled integrally with the transmission drum 52, and a piston rod 58 disposed for movement within an hydraulic cylinder 54 by the action of the threaded shaft 55, the oil pressure within the cylinder 54 being changed in response to movement of the piston rod 58.

The frame 48 is mounted on a mounting ring 49, which is secured to the body 10 of the microscope in coaxial relationship with the focussing handle 22, in a detachable manner by means of a lock screw 24, with the open end of frame 48 having a head 50 secured thereto. The transmission drum 52 is formed of an elastic material such as rubber which is fitted around and urged against the fine motion handle 22a, and is secured to one end of the transmission shaft 51 by a mounting plate 52a. The transmission shaft 51 extends through an intermediate wall 48a of the frame 48 and is rotatably disposed in coaxial relationship with the focussing handle 22. The other end of the transmission shaft is integrally formed with a transmission drum 51b having a notched groove 51a which is formed to extend in a direction parallel to the transmission shaft 51. A pin 56 fixedly mounted on the periphery of the threaded shaft 55 is fitted into the groove 51a, and the threaded shaft 55 carries the piston rod 58 fitted therein, which is disposed in the cylinder 54 which is secured so as to extend through the head 50 as by threadable engagement therewith. The threaded shaft 55 is threadably engaged with the hydraulic cylinder 54 which is threadably engaged with the head 50, and the piston rod 58 is fitted into a central axial bore therein which is coaxial with the transmission shaft 51.

The hydraulic cylinder 54 has its interior also partitioned into an oil chamber 54a and a vacant chamber 54b by means of a rolling diaphragm 57, to which is secured the free end of the piston rod 58. The oil chamber 54a in the cylinder 54 communicates with the oil chamber 41a in the first hydraulic cylinder 41 within the hydraulic drive mechanism 17 associated with the holder through hydraulic transmission tube 25 (see FIG. 2).

The hydraulic drive mechanism 23 responsive to a focussing operation is constructed such that when one revolution of the fine motion handle 22a causes the objective lens 21 to move though a distance of 200 μm, for example, such rotation of the handle 22a is transmitted through the transmission drum 52, the transmission shaft 51 and the threaded shaft 55 to be converted into an axial movement of the piston rod 58 to cause a corresponding movement of the rolling diaphragm 57, so that an amount of oil which corresponds to the stroke of the objective lens 21 is fed through the hydraulic transmission tube 25 to the cylinder 41 of the hydraulic drive mechanism 17 associated with the holder, thereby moving the needle carrier 15 through the same distance as the distance through which the object lens 21 has moved.

It will be appreciated that the above description applies when the space between the objective lens 21 and the glass needle 16 comprises air. However, a cell which is to be operated upon is frequently situated in a liquid such as a culture solution, water or the like, and when a focal position is displaced within the liquid, the length of the optical path changes, with a consequent change in the distance through which the objective lens must be moved, thus causing an offset in the focussed position of the glass needle 16 which has initially been attained. representing a variation in the length of optical path within the liquid by Δl, there results a change in the distance through which the objective lens 21 must be operated which is equal to Δl/n where n is the refractive index of the liquid. To compensate for this error, the pitch of the threads on the threaded shaft 55 is suitably chosen so that the ratio of the stroke of the objective lens 21 to the distance of movement of the needle carrier 15 in response to an adjustment of the fine motion handle 22a be equal to or close to the value of the refractive index n of the liquid, thus overcoming the problem.

Figure 9:
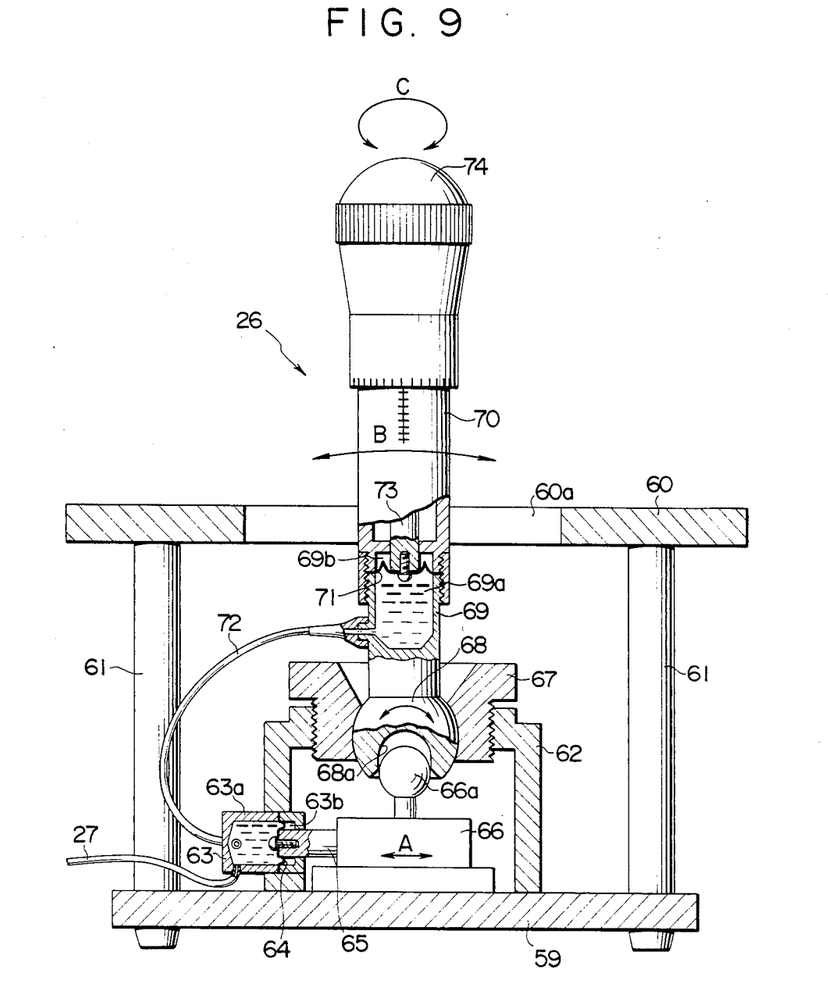
FIG. 9 is a longitudinal section of a source of hydraulic pressure and an associated operating unit which are used in the embodiment shown in FIGS. 2 and 3.

As shown in FIG. 9, the source of hydraulic pressure and its associated operator 26 which are used to operate the hydraulic drive mechanism 17 associated with the holder comprise a hand rest 60 mounted on a base 59 by means of stanchions 61 and centrally formed with an elongate slot 60a which determines the extent of oscillating movement of a joystick 70, a cylindrical frame 62 secured to the base 59, a second hydraulic cylinder 63 secured in the sidewall of the frame 62, a piston rod 65 operated by the hydraulic pressure in the second hydraulic cylinder 63, a slider 66 disposed inside the frame 62 on the base 59 so as to be slidable in the horizontal direction and carrying a ball 66a disposed for movement and to which the piston rod 65 is connected, a support frame 67 threadably engaged with the top of the frame 62, an operating shaft 68 rotatably carried within the support frame 67 and having a spherical recess 68a therein in which the ball 66a is fitted to cause a movement thereof, a third hydraulic cylinder 69 mounted on the top of the operating shaft 68, a fine motion joystick 70 extending through the slot 60a and having a piston rod 73, which causes the hydraulic pressure within the third hydraluic cylinder 69 to change, extending therein, and a coarse motion knob 74 rotatably mounted around the joystick 70 and connected with the piston rod 73.

The interior of the second hydraulic cylinder 63 is partitioned into an oil chamber 63a and a vacant chamber 63b by a rolling diaphragm 64, to which diaphragm is secured one end of the piston rod 65. The other end of the piston rod 65 is connected to the slider 66 which is slidable on the base 59 in the horizontal direction, as indicated by a double-ended arrow A. The ball 66a is secured centrally on the top surface of the slider 66 as by a pivot.

The operating shaft 68 includes a spherical articulation member which is rotatably fitted in the support frame 67 at its bottom, the support frame 67 being threadably engaged with the top of the frame 62 so as to be movable up and down. The top portion of the operating shaft 68 includes the third hydraulic cylinder 69. It will be seen that the spherical articulation member is formed with a spherical recess 68a in its bottom, in which the ball 66a is fitted. The lower end of the joystick 70 which extends downwardly through the slot 60a formed in the hand rest 60 is secured around the top of the cylinder 69. Accordingly, it is possible to oscillate the joystick 70 within the slot 60a in a direction indicated by a double-ended arrow B about the articulation member, thus causing the slider 66 to slide in either of the directions indicated by the arrow A, acting through the ball 66a.

The interior of the third hydraulic cylinder 69 is also partitioned into an oil chamber 69a and a vacant chamber 69b by a rolling diaphragm 71, to which diaphragm the lower end of the piston rod 73 is secured. The coarse motion knob 74 is mounted on the top end of the joystick 70 so as to be rotatable about the center axis of the joystick 70, as indicated by a double-ended arrow C, and is also connected to the upper end of the piston rod 73 through a threaded shaft, not shown, so that the rotation of the knob 74 causes an axial movement of the piston rod 73.

The oil chamber 63a of the second hydraulic cylinder 63 is connected to the oil chamber 69a of the third hydraulic cylinder 69 through an hydraulic transmission tube 72, thereby transmitting a displacement of the piston rod 73 in response to rotation of the coarse motion knob 74 to the second hydraliuc cylinder 63. The oil chamber 63a of the second hydraulic cylinder 63 is also connected to the oil chamber 54a of the hydraulic cylinder 54 in the hydraulic drive mechanism 23 which is responsive to the focussing operation, through the hydraulic transmission tube 27. It will be seen that the opposite edges of the elongate slot 60a formed in the hand rest 60 serve as stops which determine the extent of oscillating motion of the joystick 70.

Figure 10:
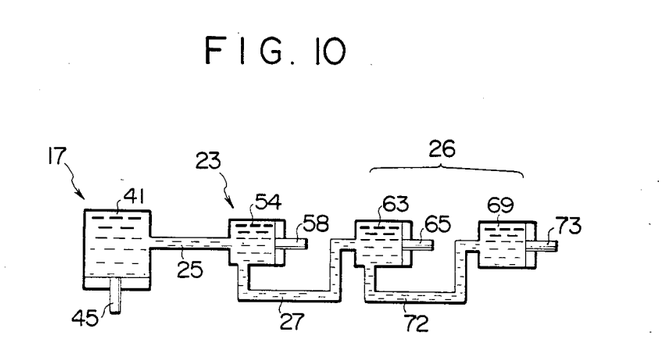
FIG. 10 is a diagrammatic view of the overall arrangement of the hydraulic drive system used in the embodiment of FIGS. 2 and 3.

FIG. 10 is a diagrammatic view illustrating the general arrangement of the hydraulic drive system. The hydraulic drive mechanism 17 which drives the needle carrier 15 has a cylinder capacity corresponding to a stroke of 12 mm, for example, and accordingly stops are provided on the hydraulic drive mechanism 23 and the hydraulic operator 26 so that a combined stroke of the mechanism 23 and the operator 26 does not exceed 12 mm, thus preventing the individual rolling diaphragms from being damaged. In the present embodiment, the hydraulic drive mechanism 23 and the hydraulic operator 26 are connected in tandem to the hydraulic drive mechanism 17, but they can be connected in parallel relationship as well. In addition, it will be seen that any desired number of hydraulic drive mechanisms may be used, provided a combined stroke of the respective hydraulic drives does not exceed the stroke of the hydraulic drive mechanism 17. In the present embodiment, the hydraulic drive mechanism 23 which is responsive to the focussing operation is connected to the fine motion handle 22a of the focussing handle 22, but alternatively, it may be connected to a vertical drive mechanism associated with the objective lens 21 or to revolver 20 directly.

As a result of the described construction of the manipulator according to the invention, the focussing handle 22 is used to perform a focussing operation upon a specimen initially placed on the stage 12. The hydraulic drive mechanism 23 responsive to the focussing operation is then connected to the fine motion handle 22a of the focussing handle 22.

The glass needle 16 is then set up. Initially, the condenser lens 14 is sprung back or removed since it stands in the way of adjusting the glass needle 16. The coarse motion handle 40 of the hydraulic drive mechanism 17 is operated to raise the support frame 28 of the needle carrier 15 sufficiently upward. A suitable length of glass needle 16 is attached to the holder 35 on the holder frame 33, which is then fitted into the feed frame 30 and secured in place by the lock screw 34. By utilizing the coarse motion handle 40 and the coarse motion knob 74 of the hydraulic operator 26 in combination, the needle carrier 15 is lowered to bring the tip of the glass needle 16 to a position slightly above the focussed position. If the objective lens having a magnification of 4×to 10×is used, the tip of the glass needle 16 will appear as a white spot in the field of view. The centering knobs 32a are then operated to move the threaded shafts 32 back and forth to adjust the location of the centering frame 30, thus bringing the glass needle 16 to the center of the field of view. Preferably the glass needle is brought to the exact center by utilizing a cross scale of an eyepiece. The joystick 70 associated with the hydraulic operator 26 is then slowly oscillated to tilt it to its lower limit stop position. While maintaining the joystick 70 at this position, the coarse motion knob 74 is turned to lower the glass needle 26 until the tip thereof coincides with the focussed position, whereupon the entire set-up operation is completed.

A pricking operation upon a cell being cultured is then performed. As the joystick 70 is oscillated, it is possible to cause the glass needle 16 to move up and down in an extent from 100 to 500 μm with the focussed position as the lower limit. When the fine motion handle 22a is turned in order to modify the focussed position, such movement is transmitted from the hydraulic drive mechanism 23 to the hydraulic drive mechanism 17, thus changing the lower limit position for the needle carrier 15. Accordingly, if the bottom surface of the culture vessel or the surface of a cell being cultured does not have a uniform plane, the tip of the glass needle 16 is maintained at a focussed position for the cell, thus automatically preventing the occurrence that the tip of the needle may be moved against the bottom surface of the vessel to cause a fracture thereof. In this manner, a pricking operation can be successively performed on sequential cells. Since the glass needle 16 is carried by the annular needle carrier 15 with the holder 35 interposed therebetween, there is no interference with the phase contrast operation which takes place between the condenser lens 14 and the specimen.

Figure 11:
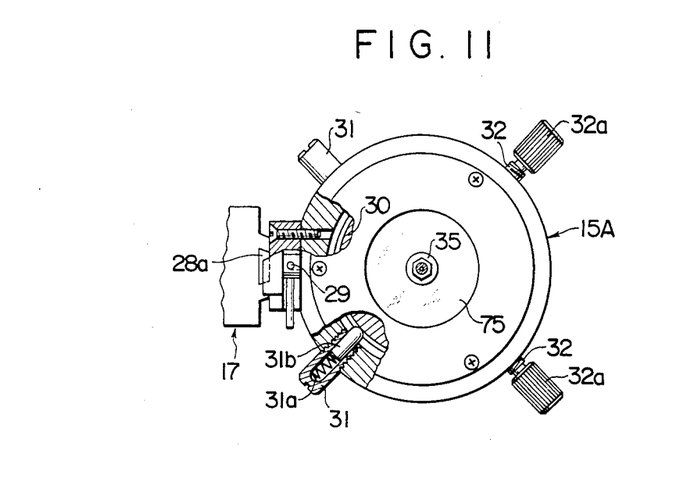
FIGS. 11 and 12 are a plan view and a longitudinal section, partly broken away, of another form of needle holder.
Figure 12:
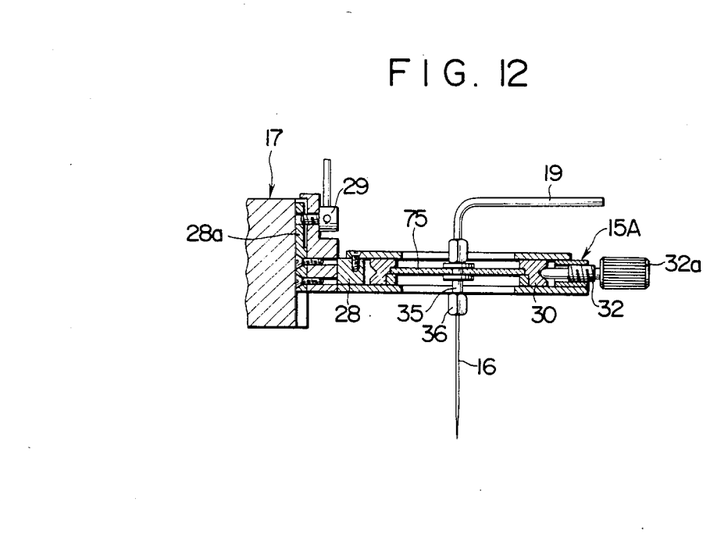

FIGS. 11 and 12 show another form of needle carrier 15A. Instead of being carried by the holder frame 33 as shown in FIGS. 4 and 5, in this instance, a transparent disc 75 is fitted in the feed frame 30, and the base of the holder 35 is carried by the central portion of the transparent disc 75. In this manner, the length as measured from the base end of the holder 35 to the tip of the glass needle 16 is reduced. Since the holder 35 is carried by the phase contrast operation which takes place between the condenser lens 14 and the specimen.

Figures 13, 14:
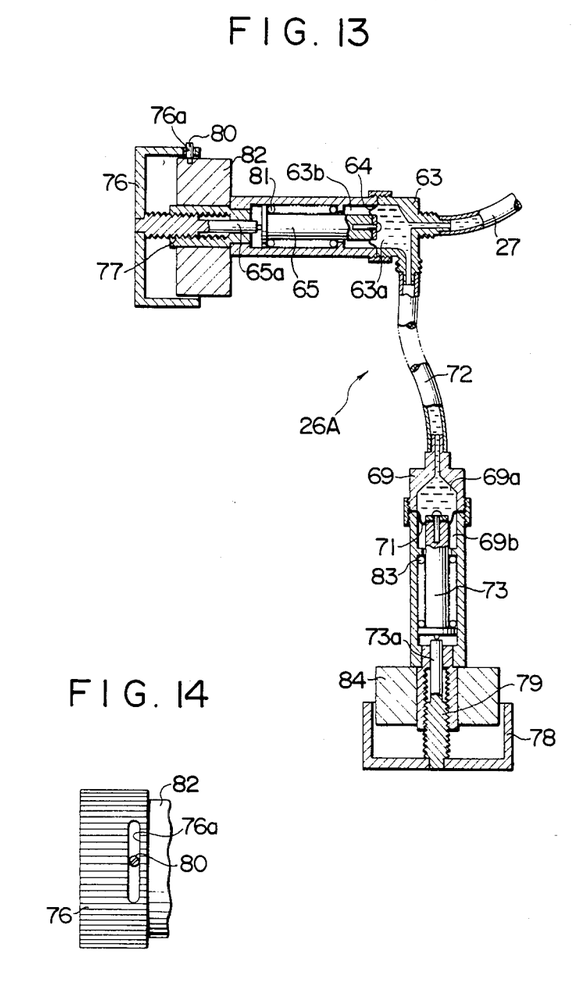
FIG. 13 is a transverse section of another form of source of hydraulic pressure and its associated operating unit.
FIG. 14 is a plan view of a fine motion knob shown in FIG. 13.

FIGS. 13 and 14 show another form of hydraulic operator 26A. In the hydraulic operator 26A, the joystick 70 shown in FIG. 9 is replaced by a combination of a fine motion knob 76 and a threaded shaft 77, and the coarse motion knob 74 is replaced by a coarse motion knob 78 having a threaded shaft 79. Specifically, the piston rod 65 associated with the cylinder 64 is urged for outward movement by a coiled spring 81, and a connecting rod 65a is connected to the threaded shaft 77 so that the end of the rod 65a may be displaced by the threaded shaft 77 which is threadably engaged with a stationary member 82. The threaded shaft 77 is turned by the fine motion knob 76 in which an elongate slot 76a is formed in which a control pin 80 fixedly mounted on the stationary member 82 is fitted to restrict the extent of angular movement. The piston 73 associated with the cylinder 69 is also urged to move outwardly by a coiled spring 83, and a connecting rod 73a couples the piston 73 with the threaded shaft 79 so that the end of the rod 73a may be displaced by the threaded shaft 79 which is threadably engaged with a stationary member 84 and turned by the coarse motion knob 78.

Such construction again achieves the similar effect and function as described in connection with the first mentioned embodiments.

We claim:

1. A micromanipulator for removable attachment to an inverted design microscope for performing a variety of minute operations upon a specimen under observation with an objective comprising:

a stage on which a specimen is to be placed;

a needle carrier disposed between the stage and a condenser lens, which is located above the stage, said carrier carrying a transparent needle of the micromanipulator said needle being substantially aligned in the direction of an optical axis of observation;

an hydraulically operable drive mechanism mounted on the stage for causing a vertical movement of the needle carrier and including a first hydraulic unit for moving the needle carrier relative to the stage to bring the needle to an in-focus position; and a source of hydraulic pressure including a second hydraulic unit remote from said first hydraulic unit and said stage for supplying an hydraulic pressure to the hydraulically operable drive mechanism, said needle carrier being aligned generally transverse to the direction of movement of said drive mechanism and having an end portion thereof joined to said drive mechanism.

2. A micromanipulator according to claim 1 in which the needle carrier includes a centering mechanism which enables the transparent needle to be centered about the optical axis.

3. A micromanipulator according to claim 1 in which the hydraulic drive mechanism comprises a mounting base secured to the stage and extending therefrom, a pinion shaft horizontally disposed to extend through the mounting base in a rotatable manner and carrying a coarse motion handle at its end for causing a rotation thereof, a first hydraulic cylinder integrally mounted on a rack which meshes with a pinion formed on the pinion shaft, and a slide integrally mounted on a piston rod which is actuated by the hydraulic pressure within the first hydraulic cylinder, the support frame of the needle carrier being movably mounted on the slide, a change in the hydraulic pressure within the cylinder causing a vertical movement of the piston rod.

4. A micromanipulator according to claim 1 in which the source of hydraulic pressure comprises a joystick, a hand rest secured to a base through interposed stanchions and centrally formed with an elongate slot serving as stops to determine the extent of an oscillating motion of said joystick, a hollow frame secured to the base, a second hydraulic cylinder secured in the sidewall of the hollow frame, a piston rod movable responsive to a change in hydraulic pressure within the second hydraulic cylinder, a slider disposed in the hollow frame on the base so as to be slidable therealong and including a ball to which the piston rod is connected through said slider, a support frame threadably engaged with the top of the hollow frame, said joystick having an operating shaft which is rotatably carried by the support frame at its lower end and including a spherical recess which is adapted to fit around the ball to cause a movement thereof, a third hydraulic cylinder mounted on the top of the operating shaft, a fine motion joystick portion extending through the elongate slot and having a piston rod extending internally therethrough and which causes a change in the hydraulic pressure of the third hydraulic cylinder due to movement of the last-mentioned piston rod, and a coarse motion rotary knob rotatably mounted around the fine motion joystick portion and connected to the piston rod for moving the last-mentioned piston rod.

5. A micromanipulator according to claim 4 in which the second and the third hydraulic cylinders are connected together by an hydraulic transmission tube, thereby causing a displacement of the piston rod in the first hydraulic unit which responds to the coarse motion rotary knob to be transmitted to the second hydraulic cylinder.

6. A micromanipulator according to claim 4 in which the elongate slot which determines the extent of oscillating motion of the joystick defines a stop for determining the lower limit position for the needle carrier relative to said stage.

7. A micromanipulator according to claim 1 in which a fine motion producing means comprises a fine motion rotary knob having a threaded shaft which causes a movement of a first piston rod in a first cylinder, and a coarse motion producing means comprises a coarse motion rotary knob having a threaded shaft which causes a movement of a second piston rod in a second cylinder, the extent for the angular movement of the fine motion rotary knob being restricted by a stop pin secured to the second cylinder and an elongate slot formed in the knob and in which the pin is fitted.

8. A micromanipulator according to claim 1 in which the source of hydraulic pressure comprises a second hydraulic cylinder having a piston rod movable within the second hydraulic cylinder to cause a change in hydraulic pressure;
a first rotary knob having a threaded shaft which causes a movement of the piston rod of said second hydraulic cylinder;
a third hydraulic cylinder having a piston rod for causing a change in the hydraulic pressure of the third hydraulic cylinder due to movement of the piston rod in said third hydraulic cylinder;
a second rotary knob for causing movement of the piston rod in the third hydraulic cylinder;
the extent of angular movement of the second rotary knob for slidably receiving said control pin fixed relative to the hydraulic cylinder; and
an elongated slot formed in said second rotary knob for slidably receiving said control pin.

9. A micromanipulator according to claim 8 wherein the ends of said elongated slot cooperate with the control pin to control the extent of angular movement of the second rotary knob.

10. A micromanipulator according to claim 8 in which means are provided for communicating hydraulic pressure from said second and third hydraulic cylinders to said first hydraulic unit.

11. A micromanipulator according to claim 1 in which said hydraulic drive mechanism further includes an additional coarse vertical drive mechanism for moving said hydraulic drive mechanism over a distance which is much greater than the distance which the first hydraulic unit is capable of moving the needle carrier.

12. A micromanipulator according to claim 11 in which said coarse vertical drive mechanism includes manually operable knob means for moving said hydraulic drive mechanism.

13. A micromanipulator according to claim 1 in which said second hydraulic unit is comprised of a plurality of hydraulic cylinders for conveying hydraulic pressure to said first hydraulic unit.

14. A micromanipulator according to claim 13 wherein the plurality of hydraulic cylinders and said first hydraulic unit are coupled in tandem fashion.

15. A micromanipulator according to claim 1 in which said second hydraulic unit is comprised of a plurality of hydraulic cylinders;
said microscope including focusing means; and
one of said hydraulic cylinders being operable to produce a hydraulic pressure responsive to operation of said focusing means.

16. A micromanipulator according to claim 1 further comprising a third hydraulic unit, said second and third hydraulic units being combined in a joystick assembly including a base and a joystick lever in which said second hydraulic unit is secured to the base of the joystick assembly and has a piston rod movable responsive to hydraulic pressure within a second hydraulic cylinder provided in said second hydraulic unit, a slider slidably mounted on said base so as to be movable in a first direction for moving said second hydraulic unit piston rod, said joystick lever having a lower end integrally formed with an operating shaft, a support arranged on said base for swingably mounting said operating shaft, the lower end of said joystick lever having a generally spherical shaped recess, a ball joined to said slider and extending into said spherical recess; said third hydraulic uint being arranged within said joystick lever and including a third hydraulic cylinder mounted in said operating shaft, a piston rod extending into said third hydraulic cylinder; screw top adjustable means threadedly engaging a threaded portion provided at the top of said joystick lever and being joined to said third hydraulic unit piston rod whereby to move said third hydraulic unit piston rod by rotation of said screw top adjustable means; a member joined to said base and having a guide slot for guiding the swingable movement of said joystick lever, the ends of said slot serving as stops to determine the extent of the swingable motion of the joystick lever.

17. A micromanipulator according to claim 16 in which the spherical recess in the lower end of said joystick lever is offset to vary the limit of the stroke of said joystick lever.

18. A micromanipulator according to claim 1 in which said first hydraulic drive unit comprises an hydraulic cylinder mounted on said stage;
a piston rod slidable within said cylinder and movable under hydraulic pressure within said cylinder; and
means for coupling said piston to said needle carrier.

19. A micromanipulator according to claim 18 further providing a rolling diaphragm arranged in said cylinder for dividing said cylinder into a hydraulic pressure chamber and a vacant chamber, said piston being in said vacant chamber and being secured to said diaphragm.

20. A micromanipulator according to claim 19 wherein said means coupled to said piston surrounds said cylinder and is slidably movable relative to said cylinder.

21. A micromanipulator according to claim 20 further comprising roller means for facilitating the sliding movement between said means for supporting said needle carrier and said cylinder.

22. A micromanipulator according to claim 21 wherein said means for coupling said piston to said needle carrier further comprises a dovetail groove; said needle carrier having a dovetail projection adapted to be received by said dovetail groove.

23. A micromanipulator according to claim 18 wherein said cylinder is provided with a dovetail projection;
   means mounted on said stage and being provided with a dovetail groove for receiving said dovetail projection.

24. A micromanipulator according to claim 23 wherein said means mounted on said stage further comprises a pinion gear mounted in said support;
   a rack engaging said pinion gear being mounted on said dovetail projection;
   knob means coupled to said pinion gear for providing coarse movement of said cylinder.

25. A micromanipulator for an inverted design microscope comprising:
   a stage on which a specimen is to be placed;
   a needle carrier disposed between the stage and the condenser lens which is located above the stage, said needle carrier supporting a transparent needle which is substantially aligned in the direction of an optical axis of observation;
   an hydraulically operable drive mechanism mounted on said stage for causing a vertical movement of the needle carrier;
   a source of hydraulic pressure for supplying a hydraulic pressure to the hydraulically operable drive mechanism;
   said needle carrier including a centering mechanism for centering the transparent needle, said needle carrier centering mechanism comprising an annular support frame fixedly mounted on a vertically movable member of the hydraulic drive mechanism and surrounding the optical axis, and a needle holder disposed within the support frame so as to be movable in a plane orthogonal to the direction of the optical axis for carrying the transparent needle, the central portion of the needle holder being formed of a transparent material.

26. A micromanipulator according to claim 25 in which the needle holder comprises an L-shaped holder having an arm which is substantially aligned with the optical axis and having a central portion which is formed of a transparent material.

27. A micromanipulator according to claim 25 in which the needle holder has a central portion of a transparent material which is directly supported by a transparent disc for extending in the direction of the optical axis.

28. A micromanipulator for an inverted design microscope comprising:
   a stage on which a specimen is to be placed;
   a needle carrier disposed between the stage and the condenser lens which is located above the stage, said needle carrier supporting a transparent needle which is substantially aligned in the direction of an optical axis of observation;
   an hydraulically operable drive mechanism mounted on said stage for causing a vertical movement of the needle carrier;
   a source of hydraulic pressure for supplying a hydraulic pressure to the hydraulically operable drive mechanism;
   said centering mechanism comprising an annular centering frame which is urged toward the center of the annular support frame by an abutment screw including a spring and an abutment pin and a threaded shaft having a centering knob, both the abutment screw and the threaded shaft being threadably engaged with the support frame, a turning of the centering knob causing a protracting and a retracting movement of the threaded shaft to center the transparent needle in a plane orthogonal to the optical axis.

29. A micromanipulator for an inverted design microscope comprising:
   a stage on which a specimen is to be placed;
   a needle carrier disposed between the stage and a condenser lens which is located above the stage for carrying a glass needle of the manipulator in the direction of an optical axis of observation;
   an hydraulic drive mechanism including a first hydraulic unit fixedly mounted on the stage for causing a vertical movement of the needle carrier;
   a focussing unit including a movable focussing handle;
   a second hydraulic drive mechanism including a second hydraulic unit responsive to a focussing operation, the said hydraulic drive unit being joined to said focussing handle associated with an objective lens, said focussing handle determining the stroke through which the objective lens has moved in terms of the amount of angular movement of a fine motion handle associated with the focussing handle; and
   a source of hydraulic pressure for providing an interconnection between the hydraulic drive units and connected to an hydraulic drive system through a hydraulic transmission tube.

30. A micromanipulator according to claim 29 in which the hydraulic drive mechanism responsive to a focussing operation comprises a cylindrical frame secured to the body of the microscope in coaxial relationship with the focussing handle, a transmission drum disposed within the frame and urged against the fine motion handle for integral rotation therewith, a threaded shaft disposed for axial reciprocating movement through a transmission shaft which is integrally mounted on the transmission drum, a piston rod disposed for movement within a cylinder in response to the threaded shaft, and a hydraulic cylinder secured to the frame and having an internal hydraulic pressure which responds to the movement of the piston rod.

31. A micromanipulator according to claim 30 in which the transmission drum is formed of an elastic material such as rubber and is fitted around and in abutting relationship with the motion handle.

32. A micromanipulator removably attached to a microscope including a microscope stage, said micromanipulator comprising:
   a needle carrier disposed between the stage and a condenser lens which is located above the stage, said carrier supporting a transparent needle which is substantially aligned in the direction of the optical axis of observation;
   hydraulic drive means arranged on said stage including a first hydraulic unit for causing movement of the needle carrier;
   a second hydraulic unit for supplying hydraulic pressure to the first hydraulic unit, characterized in that said second hydraulic unit has a second hydraulic drive mechanism including a stop to limit the delivery of hydraulic pressure to said first hydraulic unit;
   a third hydraulic drive mechanism; and
   said second and third hydraulic drive mechanism both delivering hydraulic pressure to said first hydraulic drive unit when operated.

33. A micromanipulator according to claim 32 where one of said second and third hydraulic drive mechanisms provides for a coarse adjustment of the needle.

34. A micromanipulator according to claim 33 wherein the remaining one of said second and third drive mechanisms provides for a fine adjustment of said needle.

35. A micromanipulator according to claim 34 wherein the hydraulic drive mechanism providing the coarse adjustment moves the needle over a greater distance than the hydraulic drive mechanism providing said fine adjustment.

36. A micromanipulator according to claim 32 wherein said microscope includes focusing means;
   means for coupling one of said second and third hydraulic drive mechanisms to said focusing means for delivering hydraulic pressure to said first hydraulic drive unit during operation of said focusing means.

37. The micromanipulator according to claim 32 in which one of said second and third hydraulic drive mechanisms comprises manually operable joystick means for causing its associated hydraulic drive mechanism to develop hydraulic pressure during manipulation of said manually operable joystick means.

38. A micromanipulator according to claim 37 further including stop means for limiting the movement of said manually operable joystick means.

39. A micromanipulator according to claim 38 wherein stop means is arranged to provide hydraulic pressure to said first hydraulic unit sufficient to raise and lower the transparent needle within a substantially in-focus range of movement.

40. A micromanipulator according to claim 37 in which said stop means determines the lower limit position of the needle carrier.

* * * * *

UNITED STATES PATENT AND TRADEMARK OFFICE
CERTIFICATE OF CORRECTION

PATENT NO. : 4,749,270
DATED : June 7, 1988
INVENTOR(S) : Itaru Endo; Toshimi Hayasaka; Katsura Motomura; Yasuo Inoue; Eiichi Narishige; Shinji Yoneyama It is certified that error appears in the above-identified patent and that said Letters Patent is hereby corrected as shown below:

Column 1, line 16, change "illuminion" to --illumination--.

line 65, change "mechanism," to --mechanisms,--.

Column 5, line 15, change "mvoes" to --moves--.

Column 6, line 16, change "relationshp" to --relationship--.

line 60, after "through" insert --an--.

Column 7, line 20, change "representing" to --Representing--.

Column 10, line 18, change "the" to --a--.

Signed and Sealed this

Eighth Day of August, 1989

Attest:

DONALD J. QUIGG

Attesting Officer

Commissioner of Patents and Trademarks